United States Patent [19]

Stich

[11] Patent Number: 5,080,401

[45] Date of Patent: Jan. 14, 1992

[54] ROTARY COUPLING FOR FLUID BETWEEN STATIONARY AND ROTATING MACHINE PARTS

[75] Inventor: Bodo Stich, Wiesbaden, Fed. Rep. of Germany

[73] Assignee: Glyco-Antriebstechnik GmbH, Wiesbaden, Fed. Rep. of Germany

[21] Appl. No.: 726,630

[22] Filed: Jun. 28, 1991

Related U.S. Application Data

[63] Continuation of Ser. No. 175,909, Mar. 31, 1988, abandoned.

[30] Foreign Application Priority Data

Mar. 31, 1987 [DE] Fed. Rep. of Germany ....... 3710720
Mar. 3, 1988 [DE] Fed. Rep. of Germany ....... 3806931

[51] Int. Cl.⁵ ............................................. F16L 27/08
[52] U.S. Cl. ................................... 285/190; 285/422; 285/276; 285/281
[58] Field of Search ................. 285/98, 100, 109, 190, 285/196, 905, 281, 422, 276; 277/96, 96.2

[56] References Cited

U.S. PATENT DOCUMENTS

| 3,442,539 | 5/1969 | Randall | 285/190 |
| 3,601,414 | 8/1971 | Rao | 277/96 |
| 3,633,926 | 1/1972 | Hryniszak | 277/96 |
| 4,326,736 | 4/1982 | Kusumi et al. | 285/98 |
| 4,396,212 | 8/1983 | Honke | 285/190 |

FOREIGN PATENT DOCUMENTS

| 161165 | 11/1985 | European Pat. Off. | 285/281 |
| 483584 | 2/1970 | Switzerland. | |

Primary Examiner—Dave W. Arola
Attorney, Agent, or Firm—Herbert Dubno

[57] ABSTRACT

In a rotary coupling for conducting a medium under pressure from a stationary machine part to a rotating machine part, a radially movable bushing is provided between a housing and a rotatable shaft of the rotating machine part. The radial gap between the housing and the bushing is bridged or spanned by a plurality of elastic sealing members to provide radial adjustability. A ceramic coating to minimize radial differences due to thermal expansion during frictional heating can also be provided on the shaft.

5 Claims, 3 Drawing Sheets

ROTARY COUPLING FOR FLUID BETWEEN STATIONARY AND ROTATING MACHINE PARTS This is a continuation of co-pending application Ser. No. 07/175,909 filed on Mar. 31, 1988 now abandoned.

FIELD OF THE INVENTION

My present invention relates to a rotary coupling for feeding or conducting a medium under pressure from a stationary to a rotating machine part.

BACKGROUND OF THE INVENTION

A rotary coupling for conducting a medium under pressure from a stationary to a rotating machine part can comprise a shaft which is provided with an axial service line or passage (e.g. feeding a cutting tool) and a radial connecting duct which opens into a annular passage or slot providing a feed passage for the medium. The annular passage can be sealed against the housing by appropriate sealing means.

The rotary coupling hitherto provided is a rigid or stiff system, i.e. a system in which the operational gap between the stationary and the rotating part depends in regard to its position and size exclusively on the manufacturing tolerances of the parts. No adjustment of manufactured condition and operating parameter dependent shape and position variations of this operating gap between the housing and the shaft occurs.

To maintain the hydraulic losses in the known system at an acceptable level, the gaps between the moving parts should be of the order of 5 to 10 $\mu$m. These gap widths are less than the standard mounting play so that the tolerances, the thermal effects or the like can result in mechanical contact or pressing between the stationary and rotating parts and thus excessive wear at high rotation speeds.

This danger is particularly evident when a rapid acceleration to the rated speed is required. In this case as a result of unequal thermal expansion of the bushing and the shaft, a "swelling" or "growing together" can rapidly occur at the operating gap and thus the rotary coupling can be blocked.

This eventuality has considerable economic consequences to the entire system. There is a considerable danger of an accident in which hoses, connecting tubes and the like are torn.

Because of safety considerations in many case one is thus forced to increase the gap size so that manufacturing tolerances and short time thermal effects cannot lead to contact of the rotating parts with the stationary parts.

The high leakage resulting from the large gap size and the resulting high hydraulic losses is not economical and leads to considerably increased costs.

In the Swiss Patent 483 584 a rotary coupling is described in which a compensating mechanism is provided which should compensate radially exteriorly directed forces which occur during the transmission of a fluid under pressure. A large leakage rate can thereby be prevented which would otherwise lead to an increased pump capacity requirement.

In this known rotary coupling it is disadvantageous that the transmission system acts simultaneously as the mount or bearing for the shaft. The mount or bearing unit, e.g. comprising the housing and the bushing, must thus be rigid and locally fixed relative to the shaft axis. The desired compensation mechanism thus allows only an adjustment of the shaft within the sealing gap.

This system also has the considerable disadvantage that on occurrence of manufactured or operationally required large shaft displacements there is a danger that damage to the sealing and mounting gaps, even seizing or jamming, can occur.

OBJECTS OF THE INVENTION

It is an object of my invention to provide an improved rotary coupling for feeding or conducting a medium under pressure from a stationary part to a rotating machine part which avoids the above mentioned difficulties and disadvantages.

It is also an object of my invention to provide an improved rotary coupling for feeding or conducting a medium under pressure from a stationary to a rotating machine part having rotary gaps such that it operates absolutely reliably in all operating conditions and simultaneously at high pressure and also has a reduced leakage rate.

SUMMARY OF THE INVENTION

These objects and others which will become more readily apparent hereinafter are attained in accordance with my invention in a rotary coupling for conducting or feeding a medium under pressure from a stationary to a rotating machine part comprising a shaft which is provided with an axial service line a radial connecting duct which opens into a annular passage or slot of a bushing or ring providing a feed passage for the medium, the bushing being provided between the housing and the shaft, the bushing being sealed against the housing with at least one sealing device.

By "sealing device" I mean either opposing bearing surfaces on the housing or the bushing which press against each other, mechanical seals or any similar device or combination of devices which seal the gap between the bushing and the housing. Preferably the sealing device is a pair of axially spaced O-rings.

By "rotating machine part" I mean the rotatable shaft or any associated parts rotating with it including the tool or the like using the pressurized medium. By "stationary machine part" I mean the stationary housing and its associated components.

According to my invention a radially movable bushing is provided between the housing and the shaft. A radial gap between the housing and the bushing is bridged or spanned by a plurality of elastic sealing members to provide the radial adjustability.

By these features the requirements for a rotary coupling are fulfilled in an advantageous way with sealing gaps as small as possible. Also a small leakage rate can be provided while simultaneously providing safety against seizing or jamming.

In my invention it is advantageous if the mounting or bearing function and the conduction or feed function are kept separate. The bearing and mounting can thus be optimized and made reliable and the "floating" bushing can have the narrowest sealing gaps without impairing operating reliability in the slightest. Thus a conducting bushing mounted "soft" and/or "floating" can compensate for the mounting play and manufacturing tolerances for support or mounting of the shaft.

On account of the mounting variations for mechanical contact between the rotatable shaft and bushing, the pressing force can never be greater than the compression force of the elastic sealing members, i.e. the pressing force is correspondingly reduced.

An additional advantage is that with a dirty pressurized medium the bushing can move radially and thus the gap on one side can be doubled in size or height. Dirt particles thus produced can be washed without great damage completely from this region. If despite that, e.g. because of a large amount of dirt, jamming or clamping occurs between the shaft and bushing, the bushing is caught by the shaft and relative motion occurs exclusively between the bushing and the housing in the vicinity of the seals. The reaction moment acting on the housing can thus never be greater than the friction moment or torque transmitted by the seal. The friction moments are so small that they never can cause a rotation of the housing and tearing of the connecting hoses or tubes.

Also the shaft can be coated with a thermally insulating or poorly heat conducting material, advantageously a ceramic material (e.g. SiC or WC). This coating has the advantage that it effectively prevents the shaft from growing or expanding more quickly than the bushing because of heating. Then, when the smallest gaps are provided between the bushing and the shaft, jamming or blocking because of thermal processes, e.g. thermal expansion, is effectively prevented.

The elastic sealing members can advantageously be mounted in the bushing in circular grooves spaced from each other. The bushing can be provided with a centrally located circular slot or a central feed slot for feed or transmission. For example, two circular grooves and/or elastic sealing members can be positioned on either side of the central feed slot of the bushing. Position and size of the circular grooves and/or the central feed slot are selected so that the sliding surfaces of the bushing which are cylindrical in the unpressurized free state are deformed under pressure to conical surfaces. This pressure dependent deformation leads to conical gaps smaller toward the leaking sides. Thus an additional stabilizing hydrostatic guiding force arises between the shaft and the bushing.

The circular grooves and the sealing members can also be provided in the housing in another embodiment of my invention.

BRIEF DESCRIPTION OF THE DRAWING

The above and other objects, features and advantages of my invention will become more readily apparent from the following description, reference being made to the accompanying highly diagrammatic drawing in which.

SPECIFIC DESCRIPTION

Figure 1:
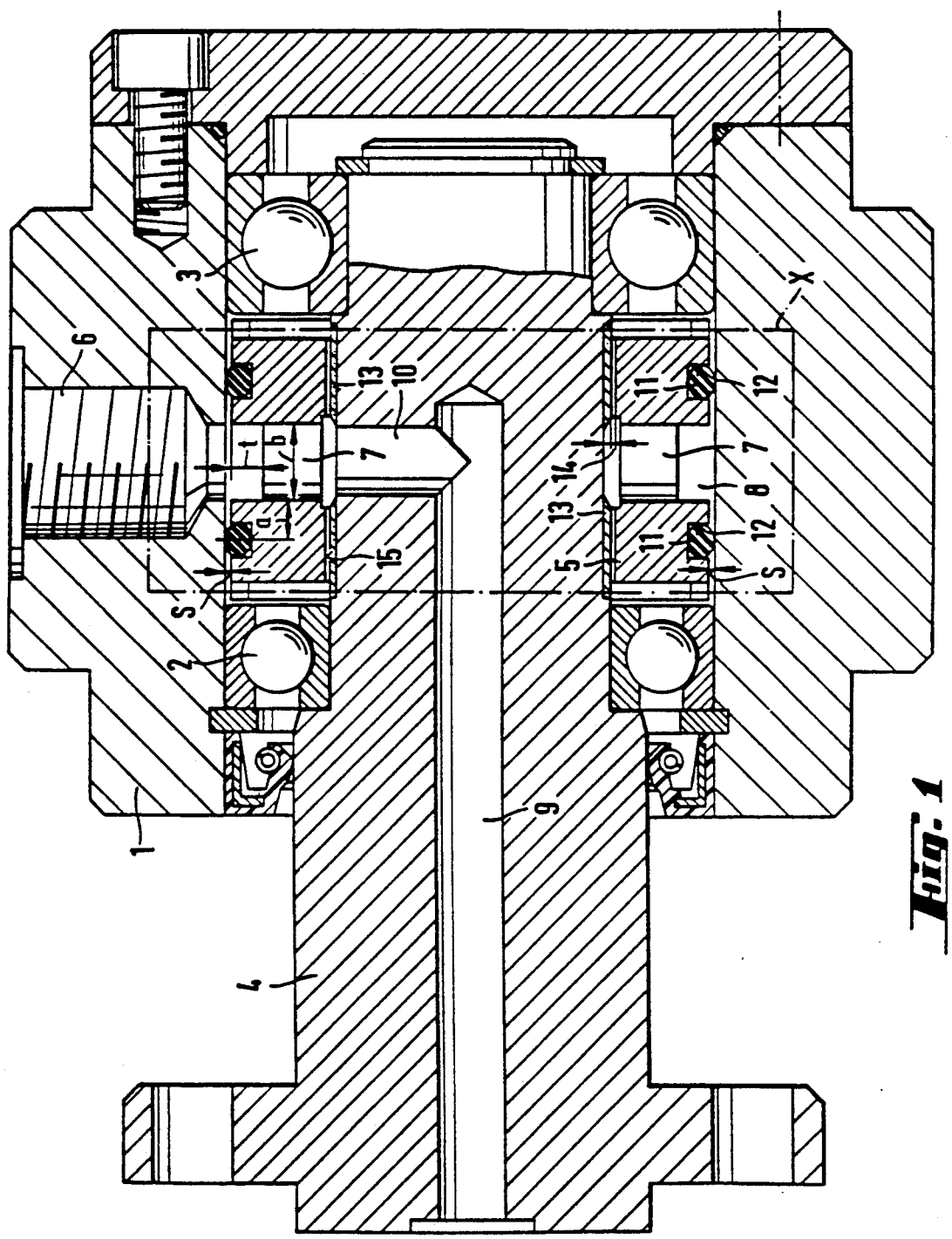
FIG. 1 is an axial cross sectional view through one embodiment of a rotary coupling for conducting a pressurized medium from a stationary machine part to a rotating machine part according to my invention.

As is indicated in the drawing a stationary housing 1 is mounted on a rotatable shaft 4 by ball bearings 2, 3.

A bushing or ring 5 is positioned between the stationary housing 1 and the rotatable shaft 4.

The housing 1 is provided with a connector port or threaded fitting 6 for connection and feed of the medium. The connector port 6 communicates with suitable angularly equispaced radial feed passages 7 which open into the central feed slot 8 of the bushing or ring 5.

The rotatable shaft 4 has an axial service line 9 with radial connecting ducts 10 which are repeatedly connected with the connector port 6 and the feed passages 7.

As the drawing indicates, for spanning the gap "S" between the bushing 5 and the housing 1 a plurality of elastic sealing members 11 are provided which are each positioned in a circular groove 12. The central feed slot 8 already mentioned is located between the circular grooves 12. The hard, poorly heat conducting or thermal insulating coating on the shaft 4 is indicated by the reference number "13".

The operation and function of the rotary coupling with floating bushing is as follows:

The medium (e.g. a machine coolant or lubricant fed through the connector port 6 passes through the central circular feed slot 8 and the radial feed passage 7 of the bushing and arrives in the axial service line 9 from which it is supplied to the surfaces to be cooled or lubricated.

Thus sufficient medium, e.g. pressurized oil, also arrives in the gap 14 between the parts moving past each other, i.e. between the coating 13 of the shaft 4 and the bushing 5.

Limited by the gap "S" and the sealing members 11 elastically spanning it, the bushing 5 is in position to adjust to the operating conditions because of the elastic or "floating" suspension and/or mounting; without that contact would occur between the shaft 4 and the bushing 5. The gap 14 between the shaft 4 and the bushing 5 is thus always present.

The elastic mounting of the bushing 5 in the housing 1 is thus such that in radial displacements the restoring forces of the elastic sealing members 11 are smaller than the hydrostatic and hydrodynamic guiding forces in the sealing gap 14.

To prevent the shaft 4 because of heating from "growing" or expanding faster than the bushing 5 the shaft 4 is provided with a coating 13 made of a hard, poorly heat conducting or thermally insulating material, e.g. a ceramic material.

Possible thermal processes which can effect the reliability of the entire assembly are thus doubly compensated, i.e. once by selection of the coating 13 and then by the elastic and/or "floating" mounting of the bushing 5. The elastic members 11 simultaneously reduce the heat transfer from the bushing 5 to the housing 1.

To increase the hydrostatic pressure dependent guiding force between the shaft 4 and the bushing 5, the sealing members 11 are so designed and the feed slot 8 is so designed and particularly shaped so that a pressure dependent deformation of the sealing surfaces and/or the outer cylindrical surfaces 15 can occur.

Figure 2:
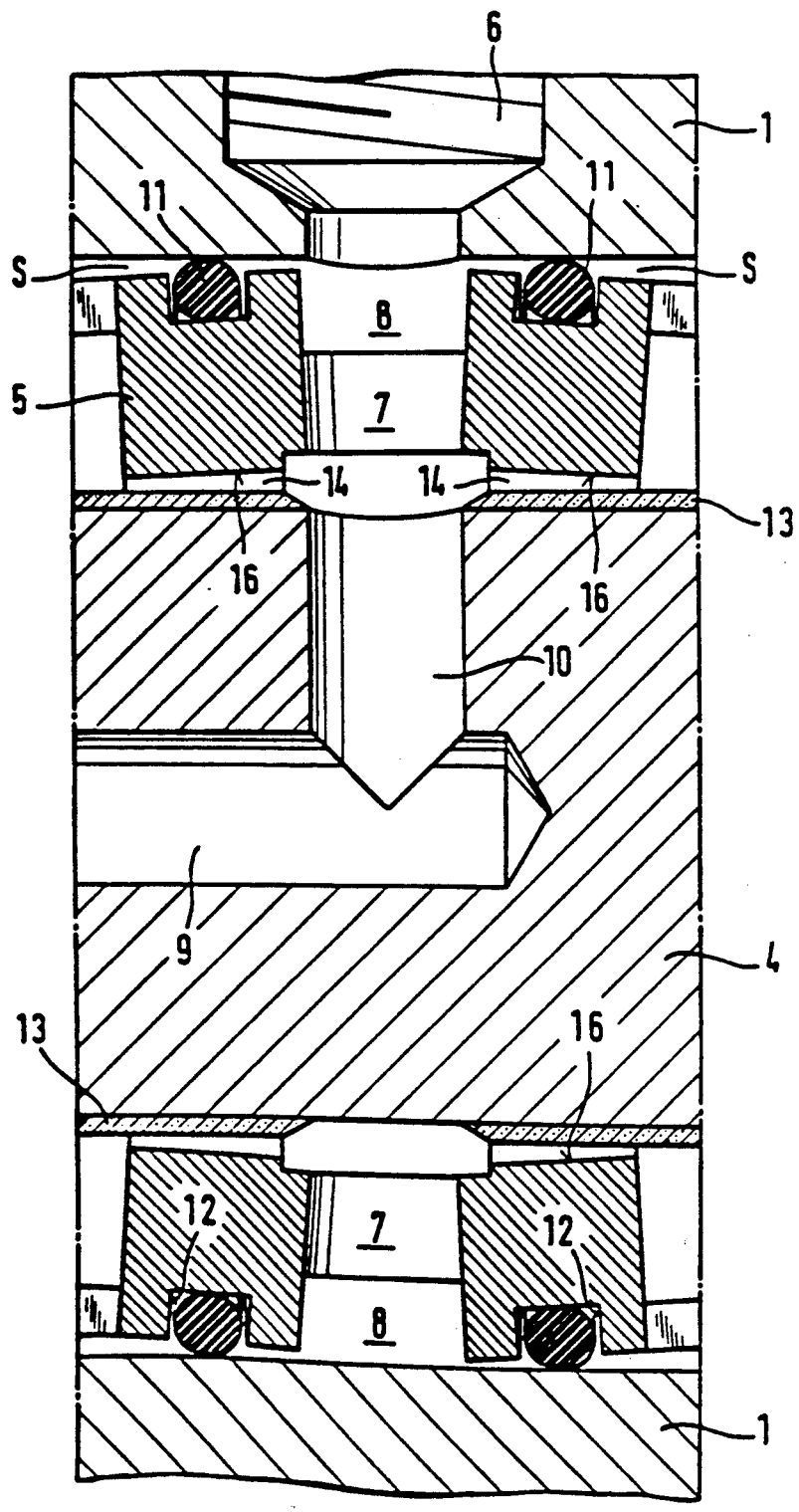
FIG. 2 is an enlarged cross sectional view showing the portion X of the rotary coupling of FIG. 1.

FIG. 2 shows this deformation in the enlarged region "X" according to FIG. 1. The spacing a of the circular groove 12 from the central feed slot 8 and its width b and depth t are so dimensioned with respect to each other that according to the pressure or limited by the pressure the cylindrical surfaces 15 can be deformed to conical surfaces 16 (exaggerated in FIG. 2). This deformation is such that the conical surfaces 16 are formed so that the large diameter of the cone is oriented on the pressurized side and the small diameter of the cone on the side with the lower pressure.

Figure 3:
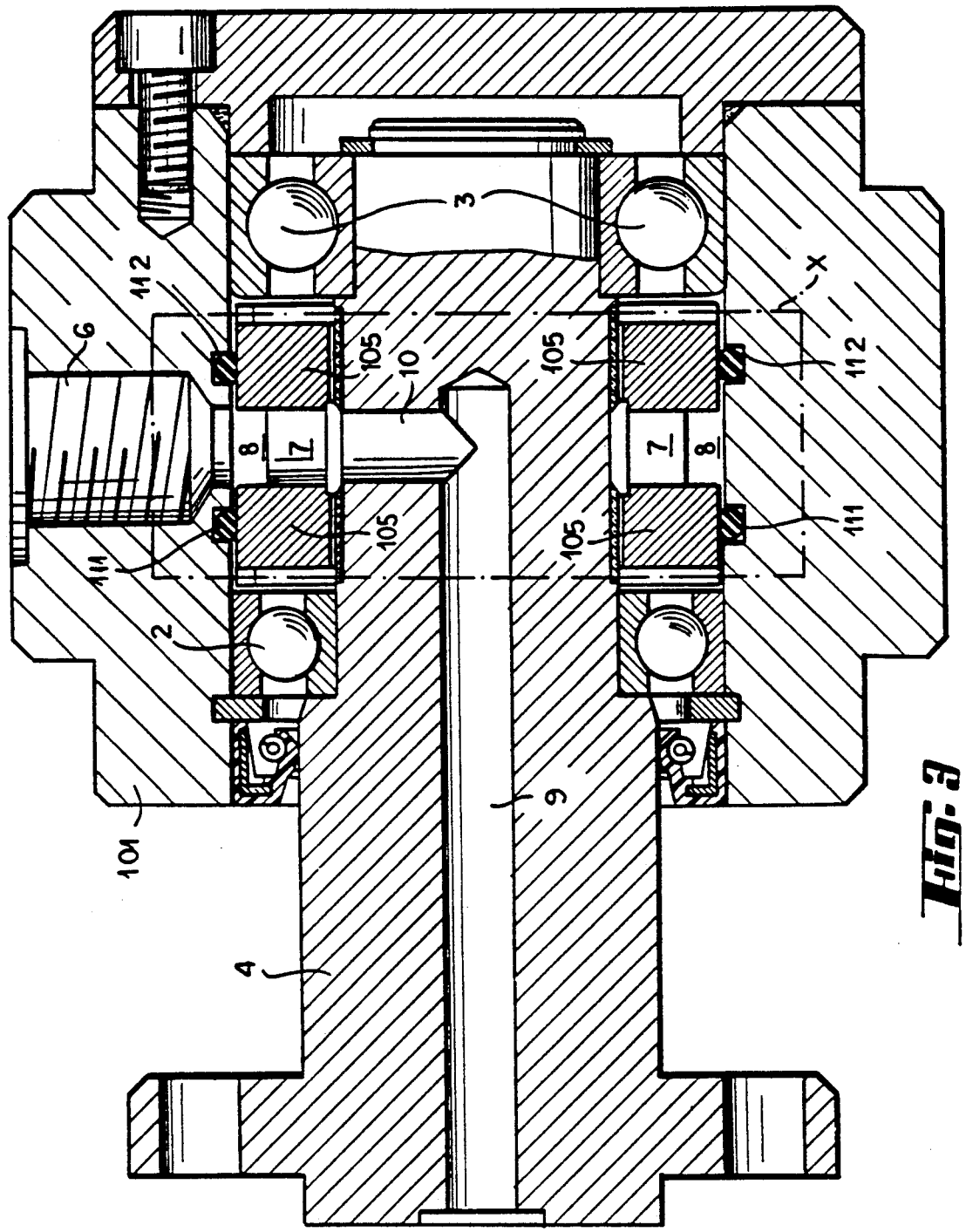
FIG. 3 is a cross sectional view through another embodiment of a rotary coupling according to my invention.

In FIG. 3 another embodiment is illustrated in which the circular grooves 112 and the elastic sealing members 111 are provided in the housing 101 instead of the bushing 105 as they are in the embodiment of FIGS. 1 and 2. Otherwise the parts are the same as those used in the embodiment of FIGS. 1 and 2. Parts which are the same are indicated with the same reference numeral.

I claim:

1. A rotary coupling for supplying a fluid medium under pressure to a machine part, comprising:

a stationary housing having an axially extending bore therein surrounding an axis and said housing formed with a radial bore;

a shaft rotatable in said housing axially extending bore about said axis and formed with an axial passage communicating with said machine part and a radial passage connected to said axial passage and opening at a peripheral surface of said shaft, and means for sealing said shaft in said housing for preventing unwanted escape of the fluid medium from said housing, said peripheral surface defining an annular space with said housing; and means for retaining said shaft in said housing;

an annular bushing received in said annular space and formed with:

an annular feed slot groove opening toward said housing and subdividing said bushing axially into two bushing segments, a plurality of radial feed passages angularly equispaced around said bushing and extending from a bottom of said feed slot groove to an inner surface of said bushing, said bushing forming radial gaps with said housing and said shaft and being free to move radially in said clearance, and respective seal grooves formed in said bushing segments and opening toward said housing at predetermined axial spacings (a) from said feed slot groove; and on opposite sides of said bore and respective elastic sealing rings received in said seal grooves and bearing against said housing, said predetermined axial spacings (a), an axial width (b) of said feed slot groove and a radial depth (t) of said feed slot groove being dimensioned so that pressure of said medium supplied to said radial bore and in said clearance deform said bushing to transform cylindrical surfaces of said segments juxtaposed with said housing and said shaft into conical surfaces.

2. The rotary coupling defined in claim 1 wherein said bushing is constructed so that said surfaces of said bushing transformed into conical surfaces have large diameters of the respective conical surfaces proximal to said feed slot groove and small diameters of the conical surfaces remote from the feed slot grooves.

3. The rotary coupling defined in claim 1, wherein said means for retaining said shaft in said housing comprises a pair of bearings jounaling said shaft in said housing on opposite axial sides of said bushing.

4. The rotary coupling defined in claim 3 wherein said periphery surface of said shaft is coated with a material of low thermal conductivity.

5. The rotary coupling defined in claim 4 wherein said material is a ceramic.

* * * * *